(12) United States Patent
Graber-Tilton et al.

(10) Patent No.: US 11,597,081 B2
(45) Date of Patent: Mar. 7, 2023

(54) SLIP HANDLING AND GROUND FRICTION ESTIMATION FOR ROBOTS

(71) Applicant: Boston Dynamics, Inc., Waltham, MA (US)

(72) Inventors: Alexander Samuel Graber-Tilton, Somerville, MA (US); Benjamin John Swilling, Winchester, MA (US)

(73) Assignee: Boston Dynamics, Inc., Waltham, MA (US)

( * ) Notice: Subject to any disclaimer, the term of this patent is extended or adjusted under 35 U.S.C. 154(b) by 144 days.

(21) Appl. No.: 16/893,739

(22) Filed: Jun. 5, 2020

(65) Prior Publication Data
US 2021/0323149 A1 Oct. 21, 2021

Related U.S. Application Data

(60) Provisional application No. 63/012,982, filed on Apr. 21, 2020.

(51) Int. Cl.
*B25J 9/16* (2006.01)

(52) U.S. Cl.
CPC .......... *B25J 9/1653* (2013.01); *B25J 9/1664* (2013.01)

(58) Field of Classification Search
CPC ...... B25J 9/1653; B25J 9/1664; B25J 9/1694; B62D 57/032
See application file for complete search history.

(56) References Cited

U.S. PATENT DOCUMENTS

| 9,387,588 | B1 | 7/2016 | Blankespoor et al. |
| 9,387,896 | B1 | 7/2016 | Blankespoor et al. |
| 9,789,611 | B1 | 10/2017 | Blankespoor et al. |

(Continued)

FOREIGN PATENT DOCUMENTS

JP 2005007491 A 1/2005

OTHER PUBLICATIONS

Jong Hyeon Park and Ohung Kwon, "Reflex control of biped robot locomotion on a slippery surface," Proceedings 2001 ICRA. IEEE International Conference on Robotics and Automation (Cat. No. 01CH37164), 2001, pp. 4134-4139 vol. 4, doi: 10.1109/ROBOT.2001.933264. (Year: 2001).*

(Continued)

*Primary Examiner* — Nicholas Kiswanto
*Assistant Examiner* — Dylan Brandon Mooney
(74) *Attorney, Agent, or Firm* — Knobbe, Martens, Olson & Bear, LLP

(57) ABSTRACT

A method of mitigating slip conditions and estimating ground friction for a robot having a plurality of feet includes receiving a first coefficient of friction corresponding to a ground surface. The method also includes determining whether one of the plurality of feet is in contact with the ground surface, and when a first foot of the plurality feet is in contact with the ground surface, setting a second coefficient of friction associated with the first foot equal to the first coefficient of friction. The method also includes determining a measured velocity of the first foot relative to the ground surface, and adjusting the second coefficient of friction of the first foot based on the measured velocity of the foot. One of the plurality of feet of the robot applies a force on the ground surface based on the adjusted second coefficient of friction.

36 Claims, 7 Drawing Sheets

(56) References Cited

U.S. PATENT DOCUMENTS 9,926,025 B1 3/2018 Blankespoor et al.
2020/0290213 A1* 9/2020 Berard ................ B62D 57/032

OTHER PUBLICATIONS

F. Jenelten, J. Hwangbo, F. Tresoldi, C. D. Bellicoso and M. Hutter, "Dynamic Locomotion on Slippery Ground," in IEEE Robotics and Automation Letters, vol. 4, No. 4, pp. 4170-4176, Oct. 2019, doi: 10.1109/LRA.2019.2931284. (Year: 2019).*
Hiroshi Takemura, Masato Deguchi, Jun Ueda, Yoshio Matsumoto, Tsukasa Ogasawara, "Slip-adaptive walk of quadruped robot," Robotics and Autonomous Systems, vol. 53, Issue 2, 2005, pp. 124-141, doi:10.1016/j.robot.2005.07.002 (Year: 2005).*
International Search Report & Written Opinion, Application No. PCT/US2021/025043, dated Jul. 9, 2021, 15 pages.
Focchi et al., "Slip detection and Recovery for Quadruped Robots," Jan. 1, 2018, 17 pages.
He et al., "Survey of Quadruped Robots Coping Strategies in Complex Situation," Nov. 6, 2019, 16 pages.

* cited by examiner

SLIP HANDLING AND GROUND FRICTION ESTIMATION FOR ROBOTS

CROSS REFERENCE TO RELATED APPLICATIONS

This U.S. patent application claims priority under 35 U.S.C. § 119(e) to U.S. Provisional Application 63/012,982, filed on Apr. 21, 2020. The disclosure of this prior application is considered part of the disclosure of this application and is hereby incorporated by reference in its entirety.

TECHNICAL FIELD

This disclosure relates to slip handling and ground friction estimation for robots.

BACKGROUND

A legged robot is a robot that can walk and/or balance on one or more legs. Each leg may include one or more physical members connected by one or more joints, and one or more actuators that apply a force or torque to the physical member(s) and/or joint(s) to move and position the robot. Each leg may further include a foot that contacts the ground as the robot walks and/or balances in a given environment.

Legged robots may be utilized in a wide variety of environments. Some environments may be difficult for a legged robot to traverse due to, for example, a slippery surface, loose particles, slopes, and/or other surface conditions, which might cause one or more of the robot's feet to slip. When a robot's foot slips, the kinematic and energetic performance of the robot may be degraded. Other appendages of a robot (e.g., an end effector) may also slip with respect to an object or surface in the environment, degrading robot performance in a similar manner.

DESCRIPTION OF DRAWINGS

Like reference symbols in the various drawings indicate like elements.

DETAILED DESCRIPTION

This disclosure provides for systems and methods that can mitigate slip of a robot appendage (e.g., a foot, an end effector, etc.). In particular, the disclosure provides for systems and methods that apply forces to the appendage based, at least in part, on velocity determined for the appendage. The disclosure further provides for dynamically adjusting the coefficient of friction associated with the appendage to thereby dynamically adjust the force applied to the appendage in a manner that efficiently and effectively arrests appendage movement during a slip condition.

When a robot operates in some environments, one or more appendages of the robot may slip. In general, an appendage may slip when a friction force between the appendage and a surface (e.g., a ground surface) is insufficient to maintain the position of the appendage on the surface. For instance, a distal end of a leg, such as a foot, or an end effector of an arm may slip on a wet surface, a muddy surface, a greasy surface, an oily surface, a surface having loose particles (e.g., gravel), a sloped surface (e.g., a grassy hill), a loose, unanchored surface (e.g., a loose, unanchored rug or mat), and/or other surfaces having a relatively low coefficient of friction.

A slipping appendage can cause a number of problems for a robot. For example, in a severe slip scenario, the robot may lose its balance and fall to the ground. However, even in less severe slip scenarios, a slipping appendage may degrade performance of the robot. For instance, a slipping foot may provide less forward thrust and/or vertical lift to the robot when attempting to move in some slip scenarios. Thus, in such scenarios, it may take more time and the robot may need to expend more energy to achieve a desired movement or positioning. Additionally, for instance, a slipping foot may place the robot in an unintended or undesirable position within the environment in which the robot is operating.

Implementations herein are directed toward systems and methods for mitigating slip of a robot appendage. In some examples, a robotic system includes a body having one or more appendages such as, for instance, feet and/or end effectors. In some implementations, the robotic system includes two or more legs that extend downwardly from the body to a ground surface. Each leg may include one or more members connected by joints and configured to operate with various degrees of freedom with respect to one another. A distal end of each leg may also include a foot, which may contact the ground surface. For a robot without feet, the distal end of each leg may contact the ground surface. The legs and feet can balance the robotic system on the ground surface. Additionally, the legs and feet enable the robotic system to move at various speeds according to mechanics for one or more different gaits.

Figure 1A:
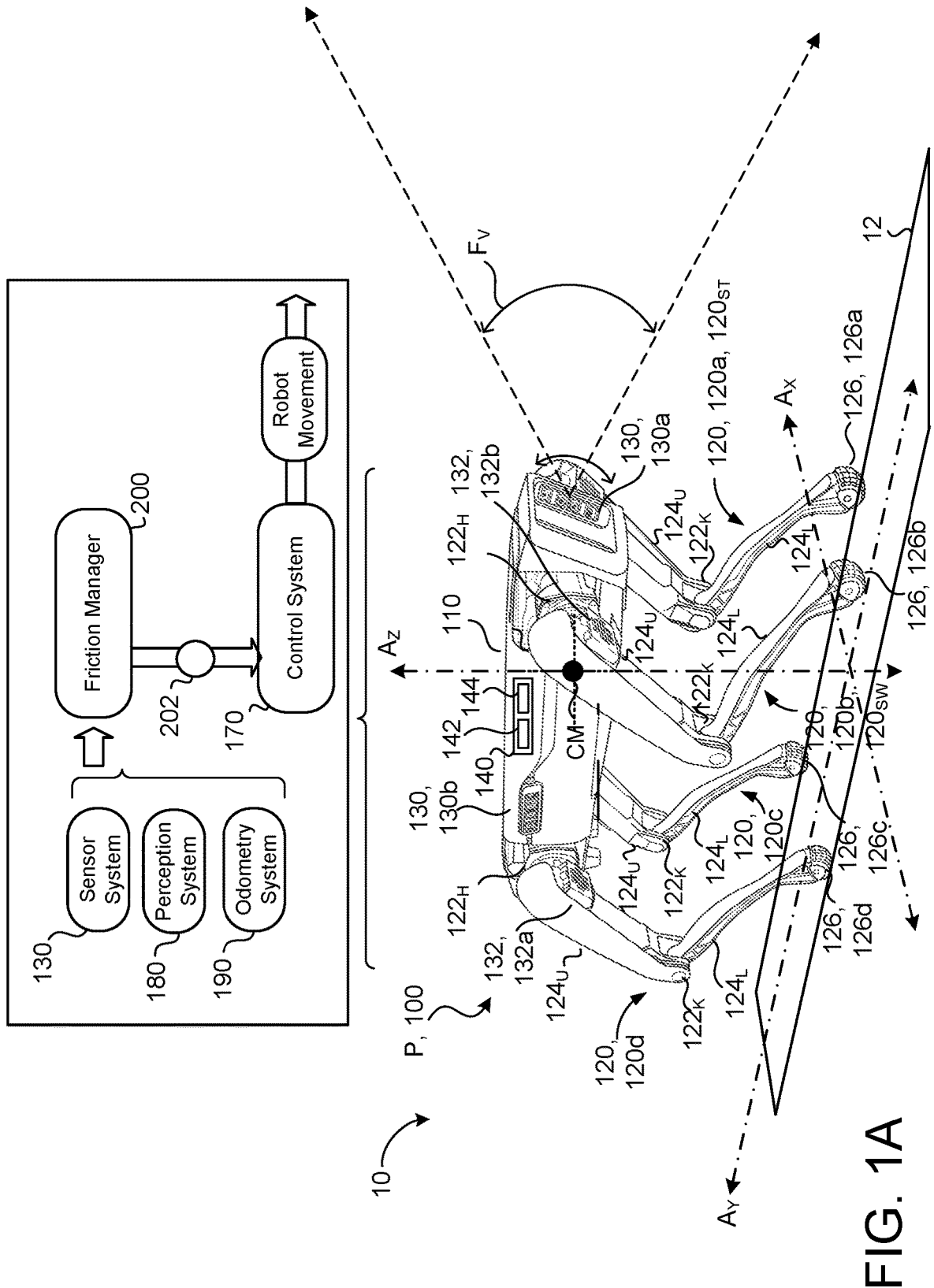
FIG. 1A is a schematic view of an example robot within an environment.

The robotic system may further include a control system that performs operations to cause the robotic system to interact with or move within an environment. In practice, each appendage may be in a swing phase or a stance phase. In the swing phase, the appendage moves through or is positioned in free space and, in the stance phase, the appendage contacts a surface (e.g., a ground surface) to support the body. To operate the robotic system in a given environment, each appendage may transition between the swing phase and the stance phase one or more times. A slip may occur, for example, when the appendage transitions into the stance phase at an initial touchdown position on a surface and then, while still in the stance phase, the appendage experiences unintended movement from the initial touchdown position. That is, the slip occurs when an appendage in the stance phase moves relative to the ground surface from the initial touchdown position Referring to FIG. 1A, the robot 100 includes a body 110 with locomotion based structures such as legs 120a-d coupled to the body 110 that enable the robot 100 to move about an environment 10. In some examples, each leg 120 is an articulable structure such that one or more joints 122 permit members 124 of the leg 120 to move. For instance, each leg 120 includes a hip joint $122_H$ coupling an upper member $124_U$ of the leg 120 to the body 110 and a knee joint $122_K$ coupling the upper member $124_U$ of the leg 120 to a lower member $124_L$ of the leg 120. Although FIG. 1A depicts a quadruped robot with four legs 120a-d, the robot 100 may include any number of legs or locomotive based structures (e.g., a biped or humanoid robot with two legs) that provide a means to traverse the terrain within the environment 10.

In order to traverse the $\mu_{terrain}$, each leg 120 has a distal end 126 (also referred to as a foot 126 of the robot 100) that contacts a surface of the terrain (i.e., a traction surface). In other words, the distal end 126 of the leg 120 is the end of the leg 120 used by the robot 100 to pivot, plant, or generally provide traction during movement of the robot 100. For example, the distal end 126 of a leg 120 corresponds to a foot of the robot 100. In some examples, though not shown, the distal end 126 of the leg 120 includes an ankle joint $122_A$ such that the distal end 126 is articulable with respect to the lower member $124_L$ of the leg 120.

The robot 100 has a vertical gravitational axis (e.g., shown as a Z-direction axis $A_Z$) along a direction of gravity, and a center of mass CM, which is a point where the weighted relative position of the distributed mass of the robot 100 sums to zero. The robot 100 further has a pose P based on the center of mass CM relative to the vertical gravitational axis $A_Z$ (i.e., the fixed reference frame with respect to gravity) to define a particular attitude or stance assumed by the robot 100. The attitude of the robot 100 can be defined by an orientation or an angular position of the robot 100 in space. Movement by the legs 120 relative to the body 110 alters the pose P of the robot 100 (i.e., the combination of the position of the CM of the robot and the attitude or orientation of the robot 100). Here, a height generally refers to a distance along the z-direction. A ground plane (also referred to as a transverse plane) spans the X-Y plane by extending in directions of the x-direction axis $A_X$ and the y-direction axis $A_Y$. The ground plane refers to a ground surface 12 where distal ends 126 of the legs 120 of the robot 100 may generate traction to help the robot 100 move about the environment 10. Another anatomical plane of the robot 100 is the frontal plane that extends across the body 110 of the robot 100 (e.g., from a left side of the robot 100 with a first leg 120a to a right side of the robot 100 with a second leg 120b). The frontal plane spans the X-Z plane by extending in directions of the x-direction axis $A_X$ and the z-direction axis $A_Z$.

When a legged-robot 100 moves about the environment 10, the legs 120 of the robot undergo a gait cycle. Generally, a gait cycle begins when a leg 120 touches down or contacts a ground surface 12 and ends when that same leg 120 once again contacts the ground surface 12. The gait cycle may predominantly be divided into two phases, a swing phase and a stance phase. During the swing phase, a leg 120 performs (i) lift-off from the ground surface 12 (also sometimes referred to as toe-off and the transition between the stance phase and swing phase), (ii) flexion at a knee joint $122_K$ of the leg 120, (iii) extension of the knee joint $122_K$ of the leg 120, and (iv) touchdown back to the ground surface 12. Here, a leg 120 in the swing phase is referred to as a swing leg 120sw. As the swing leg 120sw proceeds through the movement of the swing phase 120sw, one or more of the other legs 120 performs the stance phase. The stance phase refers to a period of time where a distal end 126 (e.g., a foot) of the leg 120 is on the ground surface 12. During the stance phase a leg 120 performs (i) initial ground surface contact which triggers a transition from the swing phase to the stance phase, (ii) loading response where the leg 120 dampens ground surface contact, (iii) mid-stance support for when the contralateral leg (i.e., the swing leg 120sw) lifts-off and swings to a balanced position (about halfway through the swing phase), and (iv) terminal-stance support from when the robot's center of mass CM is over the leg 120 until the contralateral leg 120 touches down to the ground surface 12. Here, a leg 120 in the stance phase is referred to as a stance leg $120_{ST}$.

In order to maneuver about the environment 10, the robot 100 includes a sensor system 130, 130a-b with one or more sensors 132, 132a-n (e.g., shown as a first sensor 132, 132a and a second sensor 132, 132b). The sensors 132 may include vision/image sensors, inertial sensors (e.g., an inertial measurement unit (IMU)), force sensors, and/or kinematic sensors. Some examples of sensors 132 include a camera such as a stereo camera, a scanning light-detection and ranging (LIDAR) sensor, or a scanning laser-detection and ranging (LADAR) sensor. In some examples, the sensor 132 has a corresponding field(s) of view $F_V$ defining a sensing range or region corresponding to the sensor 132. For instance, FIG. 1A depicts a field of a view $F_V$ for the robot 100. Each sensor 132 may be pivotable and/or rotatable such that the sensor 132 may, for example, change the field of view $F_V$ about one or more axis (e.g., an x-axis, a y-axis, or a z-axis in relation to a ground plane).

In some implementations, the sensor system 130 includes sensor(s) 132 coupled to a joint 122. In some examples, these sensors 132 couple to a motor that operates a joint 122 of the robot 100 (e.g., sensors 132, 132a-b). Here, these sensors 132 generate joint dynamics 134, $134_{JD}$ in the form of joint-based sensor data 134. Joint dynamics $134_{JD}$ collected as joint-based sensor data 134 may include joint angles (e.g., an upper member $124_U$ relative to a lower member $124_L$), joint speed (e.g., joint angular velocity or joint angular acceleration), and/or joint torques experienced at a joint 122 (also referred to as joint forces). Here, joint-based sensor data 134 generated by one or more sensors 132 may be raw sensor data, data that is further processed to form different types of joint dynamics $134_{JD}$, or some combination of both. For instance, a sensor 132 measures joint position (or a position of member(s) 124 coupled at a joint 122) and systems of the robot 100 perform further processing to derive velocity and/or acceleration from the positional data. In other examples, a sensor 132 is configured to measure velocity and/or acceleration directly.

When surveying a field of view $F_V$ with a sensor 132, the sensor system 130 generates sensor data 134 (also referred to as image data) corresponding to the field of view $F_V$. In some examples, the sensor data 134 is image data that corresponds to a three-dimensional volumetric point cloud generated by a three-dimensional volumetric image sensor 132. Additionally or alternatively, when the robot 100 is maneuvering about the environment 10, the sensor system 130 gathers pose data for the robot 100 that includes inertial measurement data (e.g., measured by an IMU). In some examples, the pose data includes kinematic data and/or orientation data about the robot 100, for instance, kinematic data and/or orientation data about joints 122 or other portions of a leg 120 of the robot 100. With the sensor data 134, a perception system 180 of the robot 100 may generate maps 182 for the terrain about the environment 10.

While the robot 100 maneuvers about the environment 10, the sensor system 130 gathers sensor data 134 relating to the terrain of the environment 10 and/or structure of the robot 100 (e.g., joint dynamics and/or odometry of the robot 100). For instance, FIG. 1A depicts the sensor system 130 gathering sensor data 134 about a room of the environment 10 of the robot 100. As the sensor system 130 gathers sensor data 134, a computing system 140 is configured to store, to process, and/or to communicate the sensor data 134 to various systems of the robot 100 (e.g., a control system 170, the perception system 180, an odometry system 190, and/or a friction manager 200). In order to perform computing tasks related to the sensor data 134, the computing system 140 of the robot 100 includes data processing hardware 142 and memory hardware 144. The data processing hardware 142 is configured to execute instructions stored in the memory hardware 144 to perform computing tasks related to activities (e.g., movement and/or movement based activities) for the robot 100. Generally speaking, the computing system 140 refers to one or more locations of data processing hardware 142 and/or memory hardware 144.

In some examples, the computing system 140 is a local system located on the robot 100. When located on the robot 100, the computing system 140 may be centralized (i.e., in a single location/area on the robot 100, for example, the body 110 of the robot 100), decentralized (i.e., located at various locations about the robot 100), or a hybrid combination of both (e.g., where a majority of centralized hardware and a minority of decentralized hardware). To illustrate some differences, a decentralized computing system 140 may allow processing to occur at an activity location (e.g., at motor that moves a joint of a leg 120) while a centralized computing system 140 may allow for a central processing hub that communicates to systems located at various positions on the robot 100 (e.g., communicate to the motor that moves the joint of the leg 120).

Additionally or alternatively, the computing system 140 includes computing resources that are located remotely from the robot 100. For instance, the computing system 140 communicates via a network 150 with a remote system 160 (e.g., a remote computer/server or a cloud-based environment). Much like the computing system 140, the remote system 160 includes remote computing resources such as remote data processing hardware 162 and remote memory hardware 164. Here, sensor data 134 or other processed data (e.g., data processing locally by the computing system 140) may be stored in the remote system 160 and may be accessible to the computing system 140. In some examples, the computing system 140 is configured to utilize the remote resources 162, 164 as extensions of the computing resources 142, 144 such that resources of the computing system 140 may reside on resources of the remote system 160.

In some implementations, as shown in FIGS. 1A and 1, the robot 100 includes the control system 170 and the perception system 180. The perception system 180 is configured to receive the sensor data 134 from the sensor system 130 and process the sensor data 134 to generate maps 182. With the maps 182 generated by the perception system 180, the perception system 180 may communicate the maps 182 to the control system 170 in order perform controlled actions for the robot 100, such as moving the robot 100 about the environment 10. In some examples, by having the perception system 180 separate from, yet in communication with the control system 170, processing for the control system 170 may focus on controlling the robot 100 while the processing for the perception system 180 focuses on interpreting the sensor data 134 gathered by the sensor system 130. For instance, these systems 170, 180 execute their processing in parallel to ensure accurate, fluid movement of the robot 100 in an environment 10.

In some examples, the control system 170 includes at least one controller 172, a path generator 174, a step planner 176, and a body planner 178. The control system 170 may be configured to communicate with at least one sensor system 130 and any other system of the robot 100 (e.g., the perception system 180, the odometry system 190, and/or the friction manager 200). The control system 170 performs operations and other functions using hardware 140. The controller 172 is configured to control movement of the robot 100 to traverse about the environment 10 based on input or feedback from the systems of the robot 100 (e.g., the control system 170, the perception system 180, the odometry system 190, and/or the friction manager 200). This may include movement between poses and/or behaviors of the robot 100. For example, the controller 172 controls different footstep patterns, leg patterns, body movement patterns, or vision system sensing patterns.

In some examples, the controller 172 includes a plurality of controllers 172 where each of the controllers 172 has a fixed cadence. A fixed cadence refers to a fixed timing for a step or swing phase of a leg 120. For example, each controller 172 instructs the robot 100 to move the legs 120 (e.g., take a step) at a particular frequency (e.g., step every 250 milliseconds, 350 milliseconds, etc.). With a plurality of controllers 172 where each controller 172 has a fixed cadence, the robot 100 can experience variable timing by switching between controllers 172. In some implementations, the robot 100 continuously switches/selects fixed cadence controllers 172 (e.g., re-selects a controller 172 every 3 milliseconds) as the robot 100 traverses the environment 10.

Figure 1B:
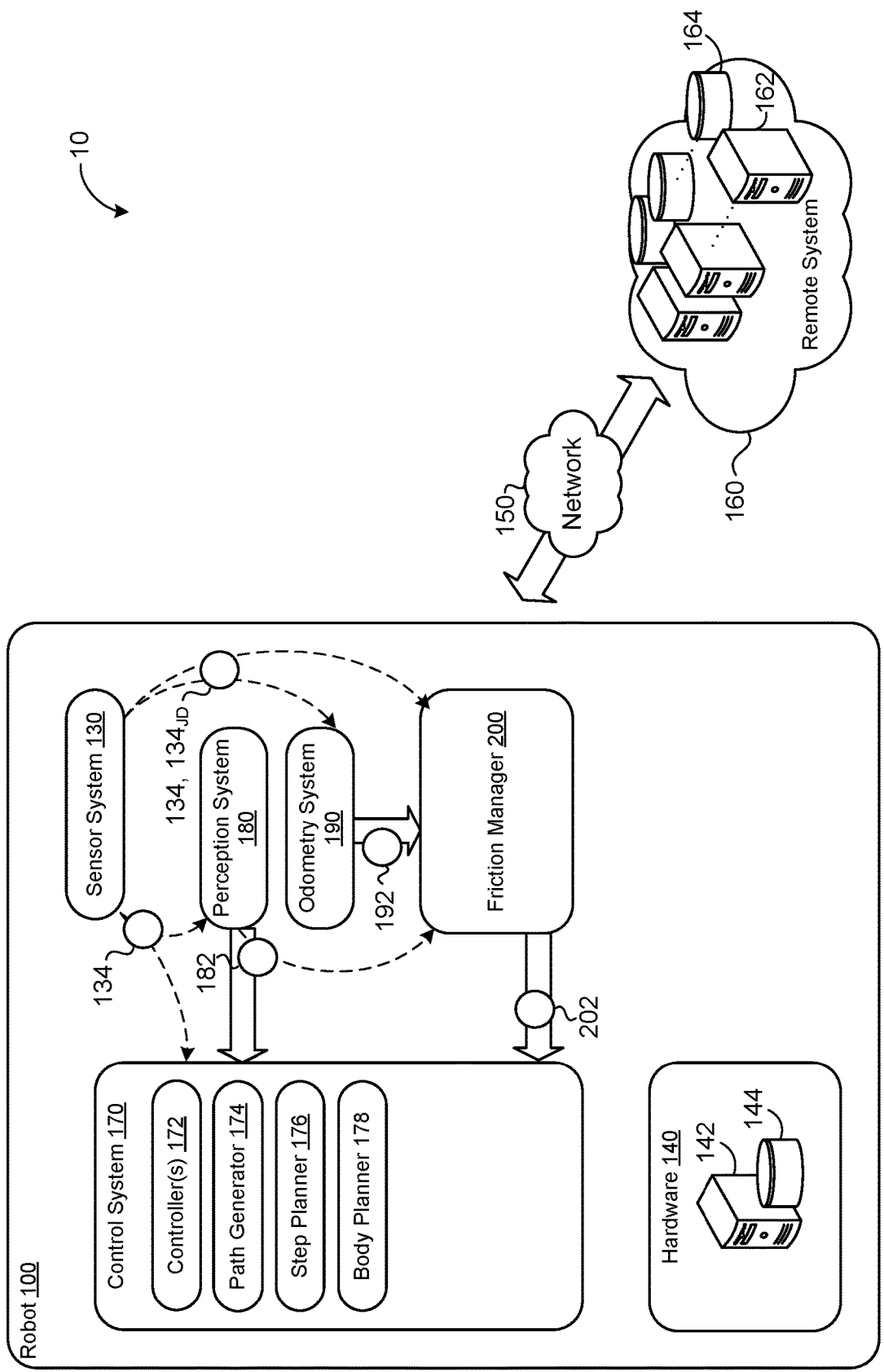
FIG. 1B is a schematic view of example systems for the robot of FIG. 1A.

Referring to FIG. 1B, the path generator 174 is configured to determine horizontal motion for the robot 100. For instance, the horizontal motion refers to translation (i.e., movement in the X-Y plane) and/or yaw (i.e., rotation about the Z-direction axis $A_Z$) of the robot 100. The path generator 174 determines obstacles within the environment 10 about the robot 100 based on the sensor data 134. The path generator 174 communicates the obstacles to the step planner 176 such that the step planner 176 may identify foot placements for legs 120 of the robot 100 (e.g., locations to place the distal ends 126 of the legs 120 of the robot 100). The step planner 176 generates the foot placements (i.e., touchdown locations for the foot 126) for each step using inputs from the perceptions system 180 (e.g., map(s) 182) and the friction manager 200. The body planner 178, much like the step planner 176, receives inputs from the perceptions system 180 (e.g., map(s) 182). Generally speaking, the body planner 178 is configured to adjust dynamics of the body 110 of the robot 100 (e.g., rotation, such as pitch or yaw and/or height of COM) to successfully move about the environment 10.

The perception system 180 is a system of the robot 100 that helps the robot 100 to move more precisely on terrain with various obstacles. As the sensors 132 collect sensor data 134 for the space about the robot 100 (i.e., the robot's environment 10), the perception system 180 uses the sensor data 134 to form one or more maps 182 for the environment 10. Once the perception system 180 generates a map 182, the perception system 180 is also configured to add information to the map 182 (e.g., by projecting sensor data 134 on a preexisting map) and/or to remove information from the map 182.

Referring further to FIG. 1B, the odometry system 190 is configured to measure where the robot 100 is located within a world reference frame (e.g., the environment 10) and how fast the robot 100 is moving in that world reference frame. In other words, the odometry system 190 generates odometry information 192 as one or more estimations (e.g., measurements) for a characteristic of the robot 100 relative to a world reference frame. In some examples, the odometry system 190 receives sensor data 134 from a sensor 132 such as an IMU (e.g., accelerometer(s) and/or gyro(s)). With the sensor data 134, the odometry system 190 may generate odometry information 192 based on an assumption that when a distal end 126 of a leg 120 is in contact with the ground surface 12 and not slipping, the distal end 126 is stationary. By combining this assumption with the sensor data 134, the odometry system 190 generates odometry information 192 regarding robot motion relative to the world reference frame (e.g., the environment 10). In other words, the odometry system 190 accounts for kinematics and inertial measurements to produce estimations about the robot 100 with respect to the world reference frame.

The friction manager 200 is configured to receive inputs from other systems of the robot 100 (e.g., the sensor system 130, the computing system 140, the remote system 160, the control system 170, the perception system 180, and/or the odometry system 190). By evaluating information from the other systems of the robot 100, the friction manager 200 determines whether a slip event has occurred, and, in some instances, generates an output 202 (e.g., an adjusted estimated coefficient of friction). In some examples, the friction manager 200 receives joint dynamics $134_{JD}$ as inputs. For example, the friction manager 200 receives angular velocities $134_{JD}$, $134_{JDV}$ to detect a velocity of the distal end 126 (e.g., to detect whether the foot has stopped moving relative to the ground). In some examples, the friction manager 200 receives joint forces $134_{JD}$, $134_{JD}f$ to enable the friction manager 200 to detect when a distal end 126 contacts the ground surface 12. In some examples, the friction manager 200 receives joint angles $134_{JD}$, $134_{JD}a$ to detect when the distal end 126 stops moving and/or a location of the distal end 126 relative to the ground surface 12 (e.g., as perceived by the robot 100).

In some configurations, in addition to the joint dynamics $134_{JD}$, the friction manager 200 receives odometry information 192 of the robot 100. The odometry information 192 enables the friction manager 200 to determine estimations for dynamics of the structure of the robot 100 by accounting for both kinematics of a world reference frame (e.g., the robot 100 with respect to the environment 10) and kinematics of a local reference frame (e.g., the body 110 or legs 120 of the robot 100 with respect to the robot 100 itself). For example, a velocity $V_{foot}$ of a foot 126 of the robot 100 is equal to a velocity of the body 110 in the world reference frame (e.g., as determined by the odometry system 190) plus a velocity $V_{foot}$ of the foot 126 relative to the body 110 (e.g., as sensed by the sensor system 130).

Additionally or alternatively, the friction manager 200 receives a map 182 from the perception system 180 (e.g., in addition to joint dynamics $134_{JD}$ and/or odometry 192). In some examples, the friction manager 200 accounts for failures of the perception system 180 to understand slip conditions or traction surface contact. Yet in some implementations, maps 182 of the perception system 180 allow the friction manager 200 to estimate a coefficient of friction 202 of the terrain. For example, the friction manager 200 may estimate the coefficient friction 202 based on a terrain characteristics (e.g., loose, solid, wet) identified on a terrain map 182.

Figure 2:
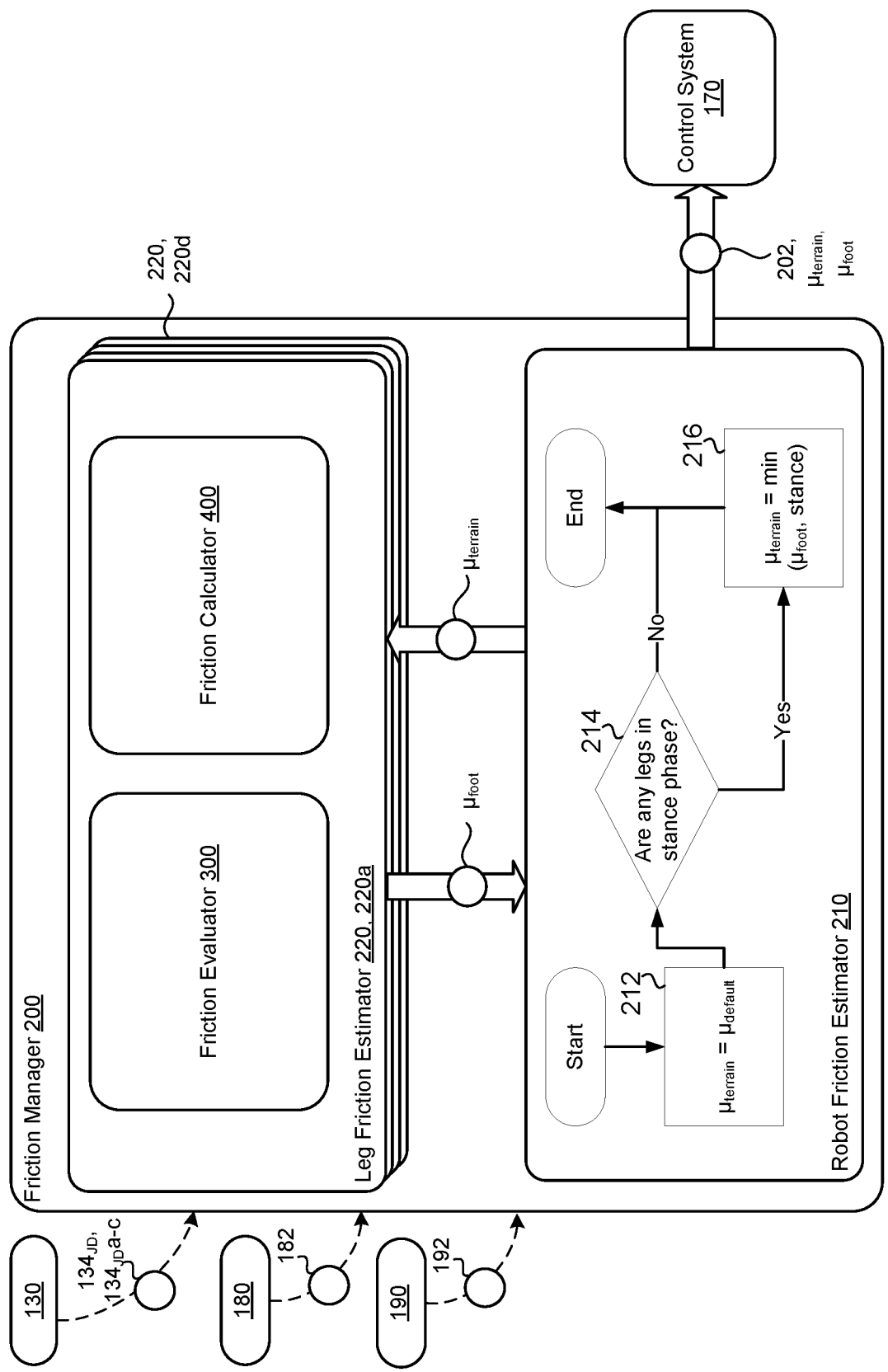
FIG. 2 is a schematic view of an example friction manager for the robot of FIG. 1A.

FIG. 2 shows a schematic view of the friction manager 200 including a robot friction estimator 210 and one or more leg friction estimators 220, 220a-n. The robot friction estimator 210 determines an overall estimated coefficient of friction $\mu_{terrain}$ of the terrain upon which the robot 100 is positioned, hereinafter referred to as the terrain friction $\mu_{terrain}$. The robot friction estimator 210 provides the terrain friction $\mu_{terrain}$ to the control system 170 for use in selecting a controller 172 and/or parameters for a gait cycle. For example, when the $\mu_{terrain}$ is relatively high, such as on a dry, solid surface, the control system 170 selects ones of the controllers 172 having a higher cadence. Additionally or alternatively, the step planner 176 of the control system 170 may use the $\mu_{terrain}$ to determine step parameters, such as touchdown locations. Distances between touchdown locations may be adjusted based on the $\mu_{terrain}$, where a higher $\mu_{terrain}$ allows for a greater distance between steps (i.e., a longer stride).

The friction manager 200 also includes one or more of the leg friction estimators 220 in communication with the robot friction estimator 220. In some examples, the friction manager 200 includes a respective leg friction estimator 220 for each leg 120 of the robot 100. Thus, the example friction manager 200 of FIG. 2 includes four leg friction estimators 220a-d, where each leg friction estimator 220 is associated with a respective one of the four legs 120a-d. For the sake of clarity, the operations of the friction manager 200 are described with respect to a single one of the leg friction estimators 220. Generally, each leg friction estimator 220 receives the terrain friction $\mu_{terrain}$ from the robot friction estimator 210, evaluates a state of the leg 120, and determines a coefficient of friction foot at the distal end (e.g., foot) 126 of the leg 120, hereinafter referred to as the foot friction $\mu_{foot}$. The leg friction estimator 220 provides the foot friction $\mu_{foot}$ to the robot friction estimator 210, and the robot friction estimator 210 uses the foot friction $\mu_{foot}$ when determining the current terrain friction terrain. The friction manager 200 continuously executes the robot friction estimator 210 and the leg friction estimator 220, such that the foot friction $\mu_{foot}$ and the terrain friction $\mu_{terrain}$ are continuously updated (e.g., terrain friction $\mu_{terrain}$ is updated every 3 milliseconds based on updated foot frictions $\mu_{foot}$)

Each leg friction estimator 220 includes a friction evaluator 300 and a friction calculator 400, which are explained in greater detail below with respect to FIGS. 3 and 4. Generally, the friction evaluator 300 of each leg friction estimator 220 determines a state of the foot 126 associated with the respective leg friction estimator 220, and then selects a value of the foot friction $\mu_{foot}$ based on the determined state. In some situations, the friction evaluator 300 determines that the selected value of the foot friction $\mu_{foot}$ is an estimated foot friction $\mu_{est}$ determined by the friction calculator 400 based on the sensor data 134, maps 182, and/or odometry information 192.

Figure 3:
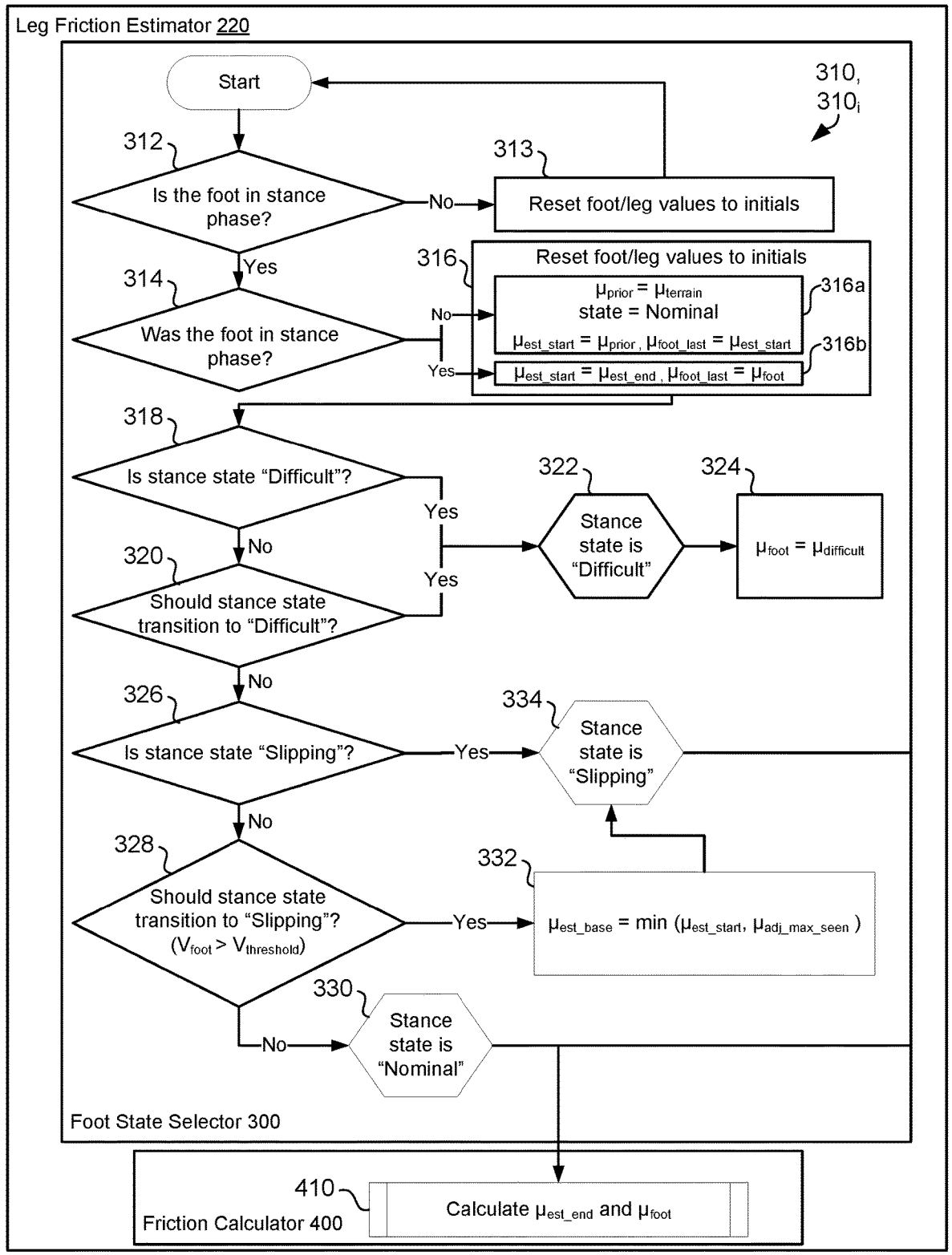
FIG. 3 is a schematic view of an example leg friction estimator for the robot of FIG. 1A.
Figure 4:
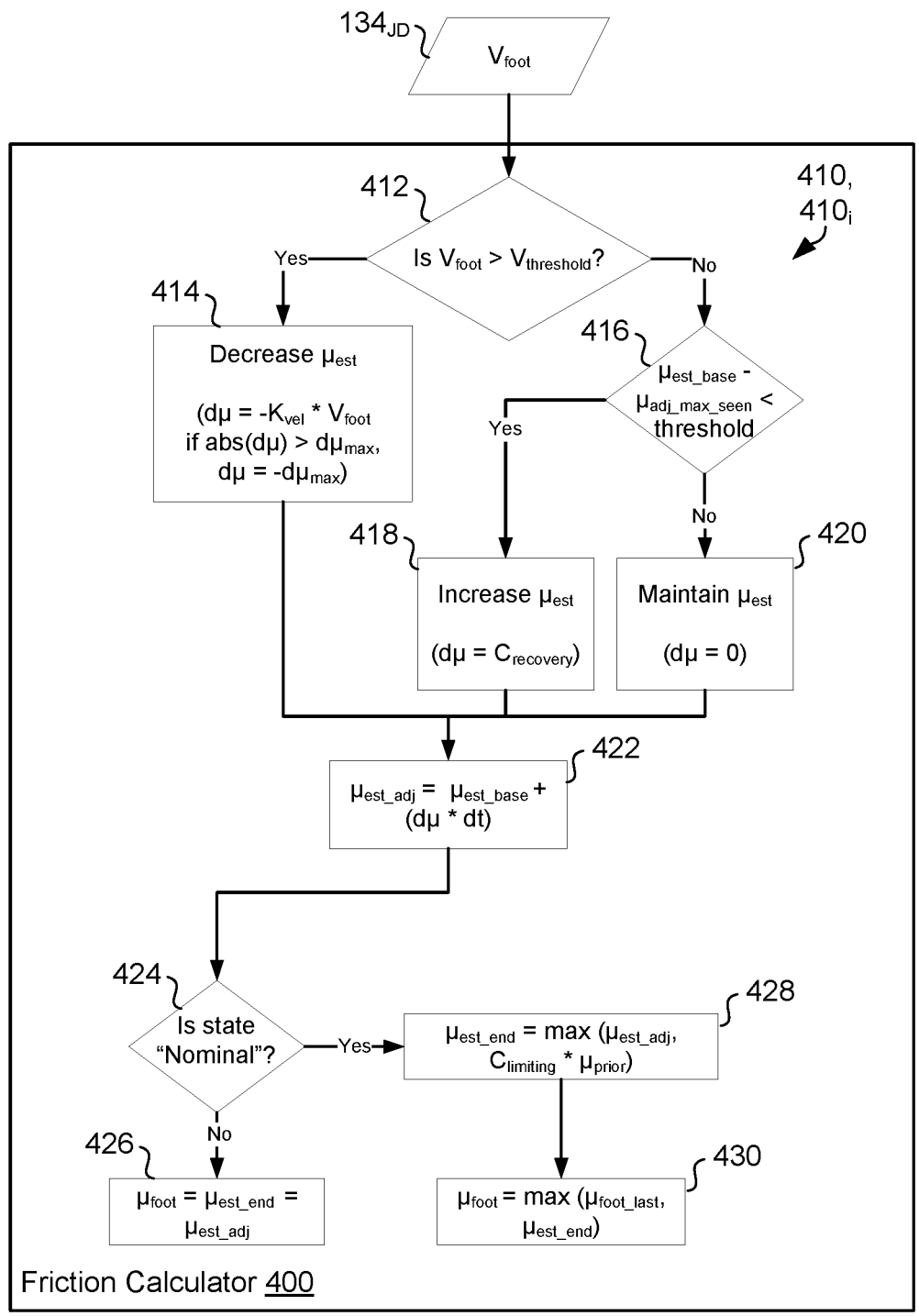
FIG. 4 is a flowchart of an example arrangement of operations for a method of evaluating friction for a foot of a robot.

FIG. 3 shows the friction evaluator 300 of the leg friction estimator 220 executing a friction evaluation process 310 to determine a category of a stance state of the foot 126, and to select a value of the foot friction $\mu_{foot}$ corresponding to the determined stance state. Here, the stance state of the foot 126 refers to the state of the foot 126 relative to the ground surface 12 or terrain when the foot 126 is in a stance phase. The stance states of the foot 126 are progressively ranked from highest to lowest according to an anticipated stability associated with the stance state, and include: (i) an Unknown stance state, (ii) a Nominal stance state, (iii) a Slipping stance state, and (iv) a Difficult stance state. When the friction evaluator 300 determines that a foot 126 is in the stance phase, the friction evaluator 300 iteratively executes the friction evaluation process 310 to determine which stance state the foot 126 is in. Thus, the friction evaluator 300 may execute multiple iterations $310_i$ of the friction evaluation process 310 while a foot 126 is in a stance phase of a gait cycle (e.g., an iteration $310_i$ every 3 milliseconds during a 100 millisecond stance phase).

The stance states are ranked by the friction evaluator 300 such that the friction evaluator 300 can transition from a higher-ranked state to a lower-ranked state (e.g., from nominal state to slipping state) during a stance phase of a gait cycle, but cannot transition from a lower-ranked state to a higher ranked state (e.g., slipping state to nominal state) during a stance phase of a gait cycle. For example, during a first iteration $310_i$ of the friction evaluation process 310, the friction evaluator 300 may determine that the foot 126 is in a Nominal stance state. During a subsequent iteration $310_{i+1}$, while the foot 126 is still in contact with the ground surface 12, the friction evaluator 300 may determine that a slip event has occurred for the foot, and in response, transitions the stance state to the Slipping stance state. During subsequent iterations $310_i$ of the friction evaluation process 310 for the respective gait cycle (e.g., while the foot 126 maintains contact with the ground surface 12), the friction evaluator 300 may transition to the Difficult stance state, but is prohibited from transitioning back to the Nominal stance state.

Referring still to FIG. 3, at step 312 of the friction evaluation process 310, the friction evaluator 300 determines whether the respective foot 126 is currently in the stance phase (i.e., the foot 126 is in contact with the ground surface 12). To determine whether the foot 126 is currently in a stance phase, the friction evaluator 300 may evaluate the joint-based sensor data 134 of the leg 120. For instance, the leg 120 may include one or more sensors 132 measuring a force $134_{JD}f$ applied to the foot 126. When the measured joint force $134_{JD}f$ associated with the foot 126 exceeds a threshold joint force, the friction evaluator 300 determines that the respective foot 126 is in contact with the ground surface 12, and thus, is in the stance phase.

When the response at step 312 is "No" (indicating that the current iteration 3101 is associated with the foot 126 not in contact with the ground surface 12) the process 310 advances to step 313 and resets parameters of the friction evaluator 300 to initial values. The process 310 then ends the current iteration $310_i$ and returns to the start step of a subsequent iteration $310_{i+1}$. In other words, steps 312 and 313 are repeated until the process 310 determines that the foot is in the stance phase.

When the friction evaluator 300 determines that the foot 126 is in a stance phase at step 312, the process 310 advances to step 314, where the friction evaluator 300 determines whether the foot 126 was in the stance phase in the previous iteration of the friction evaluation process 310. As provided above, the friction evaluator 300 executes multiple iterations $310_i$ of the friction evaluation process 310 for every stance phase of a foot 126. Accordingly, in a first one of the iterations $310_i$ associated with the moment the friction evaluator 300 determines that the foot 126 initially contacts the ground surface 12, the response at step 314 will be "no" because the foot 126 was not in contact with the ground surface 12 (i.e., was in the swing state) in the previous iteration $310_{i-i}$. However, in all subsequent iterations $310_{i+1 \ldots n}$ for the respective step, after initial contact with the ground surface 12, the response at step 314 will be "yes".

From step 314 the process 310 advances to step 316 and resets parameters of the friction evaluator 300 to initial values. However, the parameters may be set differently at step 316 depending on the response at step 314. For example, when the response at step 314 is "No" (indicating that the current iteration $310_i$ is the first iteration associated with the foot 126 being in the stance phase), the process 310 proceeds to step 316a where starting values are initialized (i.e., there are no values available from a previous iteration). Alternatively, when the response at step 314 is "Yes" (indicating that the current iteration $310_i$ is associated with a time after the touchdown of the foot 126 on the ground surface 12), the process proceeds to step 316b, where starting values are set based on end values from the immediately preceding iteration $310_{i-1}$.

At step 316a, the stance state is set to "Nominal" and the most recent value of the terrain friction $\mu_{terrain}$ provided by the robot friction estimator 210 (FIG. 2) is set as an initial or prior coefficient of friction value $\mu_{prior}$, which is utilized in later steps to adjust the estimated coefficient of friction value $\mu_{est}$. At sub-step 316a, the process 310 also sets a starting value $\mu_{est\_start}$ for the estimated coefficient friction $\mu_{test}$ and sets the last known value $\mu_{foot\_last}$ for the foot friction $\mu_{foot}$. In step 316a, the starting value $\mu_{est\_start}$ for the estimated coefficient friction $\mu_{est}$ is set equal to the prior value prior and the last known value $\mu_{foot\_last}$ for the foot friction $\mu_{foot}$ is set equal to the starting value $\mu_{est\_start}$ for the estimated coefficient friction $\mu_{est}$.

At step 316b, the process 310 sets the starting value $\mu_{est\_start}$ for the estimated coefficient friction $\mu_{est}$ equal to an ending estimated foot friction $\mu_{est\_end}$ from a prior iteration $310_{i-1}$ of the process 310. The process also sets a last known value $\mu_{foot\_last}$ for the foot friction $\mu_{foot}$ equal to the value of the foot friction set in the previous iteration $310_{i-1}$.

Once the process 310 completes step 316 (either 316a or 316b), the process advances to steps 318 and 320 to determine whether the stance state of the robot is or should be set to "Difficult." At step 318, the friction evaluator 300 determines whether the current stance state of the robot is already set to "Difficult." In other words, the friction evaluator 300 determines whether the stance state was set to "Difficult" in a previous iteration $310_{i-1 \ldots n}$ of the friction evaluation process 310.

When the response to step 318 is "No" (e.g., the stance state at the previous iteration $310_{i-1}$ is "Nominal" or "Slipping"), the friction evaluator 300 advances to step 320 to determine whether the stance state should transition to "Difficult." As mentioned previously, the Difficult stance state is associated with a ground surface 12 where the terrain is soft (e.g., grass, mud) or loose (e.g., gravel, dirt), such that the coefficient of friction for the ground surface is variable and unpredictable. At step 320, the friction evaluator 300 evaluates the joint dynamics $134_{JD}$ associated with the leg 120 and foot 126 to determine when the stance state should transition to "Difficult." Particularly, the friction evaluator 300 measures a vertical positional error $e_{normal}$ a direction normal to the ground surface 12 and a shear positional error $e_{shear}$ in all other directions to determine whether the foot 126 is on difficult terrain. For example, when a difference between the vertical positional error $e_{normal}$ and the shear positional error $e_{shear}$ exceeds an error threshold value (e.g., $e_{normal} - |e_{shear}| >$ threshold), the friction evaluator 300 determines, at step 320, that the stance state should be transitioned to "Difficult", e.g., step 320 is "Yes".

When the response to step 318 or step 320 is "Yes", the process 310 advances to step 322 and sets the stance state as "Difficult." From step 322, the process 310 advances to step 324, where the friction evaluator 300 selects a coefficient of friction $\mu_{difficult}$ associated with the difficult terrain as the foot friction $\mu_{foot}$. The difficult coefficient of friction $\mu_{difficult}$ may be a nominal friction $\mu_{nominal}$ provided to the friction evaluator 300 by a higher-level system, such as a user or the control system. When the friction evaluator 300 determines a foot 126 is in the Difficult stance state, the control system 170 may use known methods of mitigating slip events. For example, the control system 170 may estimate slip and friction based on errors or offsets between planned foot positions and actual, measured foot positions, where greater offsets are associated with greater magnitudes of slip.

With continued reference to FIG. 3, when the friction evaluator 300 determines that the foot 126 is not in the Difficult stance state at step 320 (e.g., step 320 is "No"), the process 310 advances to step 326 to determine whether the foot 126 is in the Slipping stance state. Similar to step 318, the friction evaluator 300 determines, at step 326, that the foot 126 is in the Slipping stance state during the current iteration $310_i$ when the foot 126 transitioned to the Slipping stance state during a previous iteration $310_{i-1 \ldots n}$ during the stance phase of the gait cycle. Because the stance states are progressive, once the stance state transitions to "Slipping" in previous iteration $310_{i-1 \ldots n}$, the foot 126 remains in the Slipping stance state in subsequent iterations $310_i$.

When the response at step 326 is "No" (i.e., the foot 126 is not already in Slipping stance state), the process advances to step 328 to determine whether the stance state should transition to the Slipping stance state or remain in a Nominal state. At step 326, the friction evaluator 300 evaluates the angular velocities $134_{jdV}$ associated with the leg 120 to determine whether a measured foot velocity $V_{foot}$ of the foot 126 is greater than a threshold velocity $V_{threshold}$. Under perfect conditions, the threshold velocity $V_{threshold}$ is 0, such that the friction evaluator 300 will determine that the foot 126 is in the Nominal stance state (i.e., static) when the measured foot velocity $V_{foot}$ is 0 or should transition to the Slipping stance state when the measured foot velocity $V_{foot}$ is greater than 0. However, the threshold velocity $V_{threshold}$ may be greater than zero to account for noise in the joints 122 of the leg 120 and the sensor system 170. Additionally or alternatively, the friction evaluator 300 may determine a difference between an actual foot position $P_{actual}$ and an expected foot position $P_{expected}$ to determine a slip error or slip distance ($P_{actual}-P_{expected}=P_{error}$). When the determined position error $P_{error}$ exceeds a threshold position error $P_{threshold}$, the friction evaluator 300 determines that the foot 126 should be transitioned to the Slipping stance state, i.e., step 328 is "Yes". Like the threshold velocity $V_{threshold}$, the position error threshold $P_{threshold}$ may be greater than 0 to account for noise in the joints 122 and sensor system 130 of the robot 100.

When the friction evaluator 300 determines that the foot 126 is not in a slipping event (i.e., step 328 is "No"), the process 300 advances to step 330 and sets the stance state to "Nominal." However, when the friction evaluator 300 determines that the foot 126 is slipping (i.e., step 328 is "Yes"), the friction evaluator 300 immediately selects a base estimated foot friction $\mu_{est\_base}$ at step 332 to mitigate the slipping condition. Generally, when the foot 126 is in a slipping condition, the friction evaluator 300 selects an estimated foot friction $\mu_{est}$ that is less than the most-recent value of foot friction $\mu_{foot}$ provided to the leg friction estimator 220. As discussed below, when the foot 126 is in the Slipping stance state, the foot friction $\mu_{foot}$ provided to the robot friction estimator 220 by the leg friction estimator 220 (FIG. 2) is equal to the estimated foot friction $\mu_{est\_end}$ of the current iteration $310_i$. Thus, when foot 126 slips, the friction evaluator 300 reduces the value of the foot friction $\mu_{foot}$ that is sent to the robot friction estimator 210, which then incorporates the reduced foot friction $\mu_{foot}$ in determining the terrain friction $\mu_{terrain}$ that is provided to the control system 170 and the leg friction estimators 220 in subsequent iterations.

At step 332, the friction evaluator 300 selects the lower coefficient of friction value from a set including: (i) the starting value $\mu_{est\_start}$ for the estimated coefficient friction $\mu_{est}$ and (ii) a maximum adjusted coefficient of friction seen $\mu_{max\_adj\_seen}$ by the control system 170 for the current stance phase. The maximum adjustment coefficient of friction seen $\mu_{max\_adj\_seen}$ is equal to the product of a maximum coefficient of friction requested $\mu_{max\_requested}$ by the control system 170 during the current stance phase and a degradation coefficient D. The maximum requested coefficient of friction $\mu_{max\_requested}$ refers to the highest coefficient of friction that robot control system 170 has requested for the current stance phase of the foot 126. The degradation coefficient D is a tuned constant selected by an operator. For example, the degradation coefficient D may be 1/0.9 where the control system 170 is configured to request coefficient of friction values μ up to about 90% of the terrain foot friction $\mu_{terrain}$. By selecting the lower value from the (i) the starting estimated foot friction $\mu_{est\_start}$ and (ii) the maximum adjusted coefficient of friction seen $\mu_{max\_adj\_seen}$ by the control system 170 for the current stance phase, the friction evaluator 300 immediately provides an upper limit $\mu_{est\_base}$ for value of the estimated foot friction pest, where the upper limit corresponds to a coefficient of friction value p associated with a static condition (i.e., non-slipping) of the foot 126.

At step 334, the friction evaluator 300 sets the stance state to "Slipping" based on affirmative responses at step 326 or step 328. After setting the stance state to "Nominal" (step 330) or "Slipping" (step 334), the friction evaluator 300 instructs the friction calculator 400 to execute a friction calculation process 410 to determine an updated value of the foot friction $\mu_{foot}$. The friction calculation process 410 is illustrated in FIG. 4. Particularly, FIG. 4 shows an iteration $410_i$ of the friction calculation process 410 associated with the iteration $310_i$ of FIG. 3.

In a first step 412 of the friction calculation process 410, the friction calculator 400 receives the measured foot velocity $V_{foot}$ for the foot 126 and determines whether the measured foot velocity $V_{foot}$ is greater than the threshold foot velocity $V_{threshold}$ discussed above. A measured foot velocity $V_{foot}$ that is greater than the threshold foot velocity $V_{threshold}$ corresponds to the foot 126 being in a slip condition. Thus, when the response to step 412 is "yes", the friction calculation process 410 advances to step 414 to determine a friction adjustment rate d to mitigate the slipping condition. Accordingly, the friction adjustment rate d at step 414 will be a negative friction adjustment rate d to ultimately reduce the value of the foot friction $\mu_{foot}$ provided to the robot friction estimator 210. At step 414, the friction adjustment rate d is calculated by multiplying the measured foot velocity $V_{foot}$ by a negative velocity coefficient $-K_{vel}$. However, the friction adjustment rate dμ is constrained, such that if the magnitude of the calculated friction adjustment rate dμ exceeds a predetermined maximum friction adjustment rate $d\mu_{max}$, then the friction calculator 400 sets the friction adjustment rate d as the negative value of the maximum friction adjustment rate d max.

When the friction calculator 400 determines that the measured foot velocity $V_{foot}$ is less than the threshold foot velocity $V_{threshold}$ (i.e., the foot 126 is not slipping) at step 412, the friction calculator proceeds to steps 416-420 to determine the friction adjustment rate dμ. In contrast to step 414, where the friction calculator 400 calculates a negative friction adjustment rate d in response to a slipping condition, the friction calculator 400 outputs, at either step 418 or step 420, a friction adjustment rate d that is greater than or equal to zero (0) in response to a static condition. Thus, the friction calculator 400 is generally configured to maintain or increase the foot friction $\mu_{foot}$ when the foot 126 is not slipping.

At step 416, the friction calculator 400 determines whether a difference between the base estimated foot friction $\mu_{est\_base}$ and the maximum adjusted coefficient of friction seen $\mu_{max\_adj\_seen}$ exceeds a predetermined threshold value. When the difference between the base estimated foot friction $\mu_{est\_base}$ and the maximum adjusted coefficient of friction seen $\mu_{max\_adj\_seen}$ is less than the threshold value, the process 410 advances to step 418 to increase the estimated foot friction $\mu_{est}$. In other words, when the value of maximum adjusted coefficient of friction seen $\mu_{max\_adj\_seen}$ is near the value of the base estimated foot friction $\mu_{est\_base}$ (i.e., within the threshold) and the foot 126 is not slipping, then the friction calculator 400 determines that the estimated foot friction $\mu_{est}$ should be increased (step 418). In the illustrated example, the friction calculator 400 sets a value of the friction adjustment rate d equal to a positive recovery coefficient $C_{recovery}$. The recovery coefficient $C_{recovery}$ is a positive constant value that is tuned according to target response characteristics.

When the difference between the base estimated foot friction $\mu_{est\_base}$ and the maximum adjusted coefficient of friction seen $\mu_{max\_adj\_seen}$ is less than the threshold value, then the friction calculator 400 proceeds to step 420 and sets the friction adjustment rate dµ as zero (0). In other words, when the value of maximum requested coefficient of friction $\mu_{max}$ is substantially less than the current value of the prior estimated foot friction $\mu_{prior}$ (i.e., outside the threshold) and the foot 126 is not slipping, then the friction evaluator 300 determines that the foot friction $\mu_{foot}$ does not need to be increased.

After the friction calculator 400 determines the friction adjustment rate d at one of steps 414, 418, 420, the process 410 advances to step 422 to calculate the adjusted estimated foot friction $\mu_{est\_adj}$ for the current iteration 410$_i$ based on the friction adjustment rate dµ. Here, the adjusted estimated foot friction $\mu_{est\_adj}$ is equal to the base estimated foot friction $\mu_{base\_est}$ adjusted by the friction adjustment rate d over a period of time dt for the iteration 410$_i$ (e.g., 3 milliseconds).

At step 424, the friction calculator 400 requests the current stance state from the friction evaluator 300 and determines whether the stance state is "Nominal." When the stance state is not "Nominal," (i.e., the stance state is "Slipping") the friction calculation process 410 advances to step 426 and sets the foot friction $\mu_{foot}$ and the ending estimated foot friction $\mu_{est\_end}$ for the current iteration 310$_i$, 410$_i$ equal to the adjusted estimated foot friction $\mu_{est\_adj}$ previously calculated in step 422.

When the friction calculator 400 determines that the stance state is "Nominal" at step 424, the process 410 advances to step 428. At step 428, the friction calculator 400 is configured to set a limit on the amount that the friction calculator 400 can decrease the foot friction $\mu_{foot}$ when the current stance state is "Nominal." For example, the friction calculator 400 may determine that the foot 126 is slipping at step 412 and calculate a reduced estimated foot friction $\mu_{est\_adj}$ at steps 414 and 422. However, when the stance state is "Nominal", the friction manager 200 does not provide negative feedback to the control system 170. In other words, a foot 126 may begin slipping while the stance state for the foot 126 is "Nominal," but the control system 170 will not request a reduced coefficient of friction until the friction evaluator 300 changes stance state changes to "Slipping." Accordingly, to prevent the friction calculator 400 from over-reducing the foot friction $\mu_{foot}$ to address the slipping condition during a Nominal stance state, the friction calculator 400 limits the reduction by setting a lower limit on the ending estimated foot friction $\mu_{est\_end}$ equal to the greater of (i) the adjusted estimated foot friction $\mu_{est\_adj}$ determined in step 422 or (ii) the product of a limiting constant C and the prior estimated friction prior of the foot 126. The limiting constant $C_{limiting}$ is a tuned constant having value less than 1, such that the resulting product of the limiting constant $C_{limiting}$ and the prior estimated foot friction $\mu_{prior}$ is less than the prior estimated foot friction $\mu_{prior}$. The limited ending estimated foot friction $\mu_{est\_end}$ ensures that the foot friction foot is never reduced to less than the value of the limiting constant (e.g., 80%) times prior estimated foot friction $\mu_{prior}$.

At step 430, the friction calculator 400 updates the value of the foot friction $\mu_{foot}$ to be the greater of (i) the last known value foot friction $\mu_{foot\_last}$ determined in the previous iteration 410$_{i-1}$ or (ii) the limited ending estimated foot friction $\mu_{est\_end}$ selected at step 428. Accordingly, when the stance state is "Nominal" the updated value of the foot friction $\mu_{foot}$ will be at least the value of the last known foot friction $\mu_{foot\_last}$.

Referring again to FIG. 2, after each iteration 310$_i$, 410$_i$, the robot friction estimator 210 executes a process to update the terrain friction $\mu_{terrain}$ based on the updated foot friction $\mu_{foot}$ values provided by the leg friction estimators 220. In an initial step 212, when the robot 100 is first started, the robot friction estimator 210 sets the value of the terrain friction $\mu_{terrain}$ equal to a default coefficient of friction $\mu_{default}$ determined by the operator. At step 214, the robot friction estimator 210 determines whether any of the legs 120 are in the stance phase. When at least one of the legs 120 is in the stance phase, the robot friction estimator 210 advances to step 216 and sets the value of the terrain friction $\mu_{terrain}$ equal to the minimum foot friction $\mu_{foot}$ associated with one of the feet 126 of one of the legs 120$_{ST}$ in the stance phase. Thus, where two of the legs 120 are in a stance phase, the robot friction estimator 210 sets the value of the terrain friction $\mu_{terrain}$ equal to the lowest foot friction $\mu_{foot}$ associated with the two stance legs 120$_{ST}$.

As discussed above, the updated terrain friction $\mu_{terrain}$ is continuously provided to the control system 170 to be incorporated in planning future movements of the robot. For example, step locations, speeds, and cadences are determined by the control system based on the updated terrain friction $\mu_{terrain}$.

Figure 5:
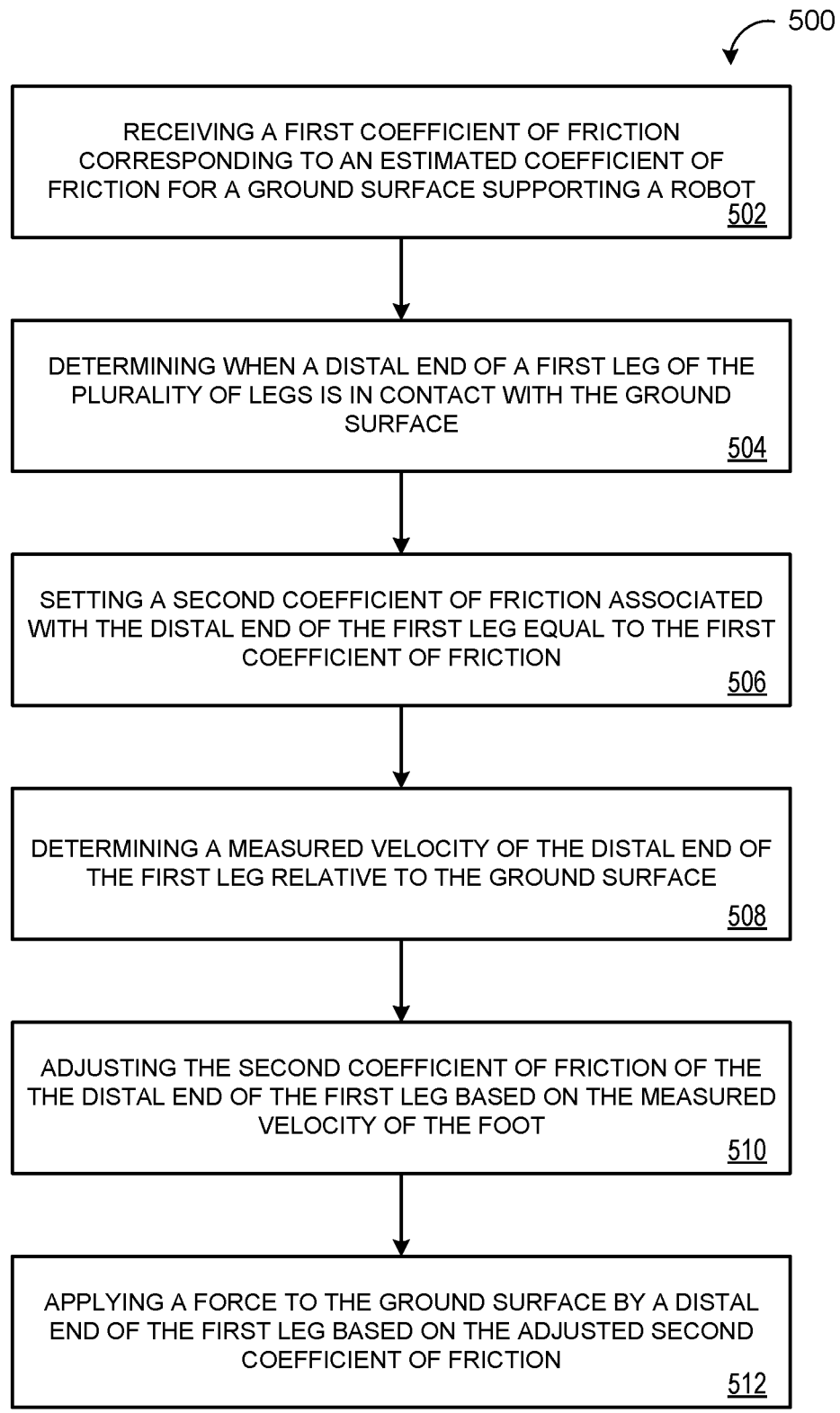
FIG. 5 is a flowchart of an example arrangement of operations for a method of calculating friction for a foot of a robot.

FIG. 5 is a flowchart of an example arrangement of operations for a method 500 for slip handling and ground friction estimation for a robot 10. At operation 502, the method includes receiving, at data processing hardware of a robot including a plurality of legs, a first coefficient of friction corresponding to an estimated coefficient of friction for a ground surface supporting the robot. For example, the first coefficient of friction may be associated with the terrain friction $\mu_{terrain}$ received by the leg friction estimator 220 from the robot friction estimator 210, as shown in FIG. 2.

At operation 504, the method includes determining, by the data processing hardware, when a distal end of a first leg of the plurality of legs is in contact with the ground surface 12. For example, at steps 312 and 314 of the leg friction estimation process 310, the leg friction estimator 310 determines whether the respective foot 126 is in the stance phase or was in the stance phase based on joint dynamics 134$_{JD}$f associated with the foot 126.

When the distal end 126 of the first leg 120 of the plurality of legs 120 is in contact with the ground surface 12, the method 500 includes setting, by the data processing hardware, a second coefficient of friction associated with the distal end of the first leg equal to the first coefficient of friction at step 506. For example, at step 316 of the leg friction evaluation process 310, the leg friction evaluator 300 resets the value of the foot friction $\mu_{foot}$ for the respective foot 126 (i.e., the second coefficient of friction) equal to the terrain friction $\mu_{terrain}$ provided by the robot friction estimator 210. The method 500 also includes determining, by the data processing hardware, a measured velocity $V_{foot}$ of the distal end 126 of the first leg 120 relative to the ground surface 12 when the first foot 126 is in contact with the ground surface. For example, at step 412 of the friction calculation process 400, the leg friction estimator 210 determines whether the measured velocity $V_{foot}$ exceeds a threshold velocity $V_{threshold}$. At step 510 of the method 500, the data processing hardware adjusts the second coefficient of friction of the distal end (i.e., the foot friction $\mu_{foot}$) based on the measured velocity of the distal end. For example, at steps 414, 418, 420 of the friction calculation process 410, the friction calculator 400 determines a friction adjustment rate d depending on the response at step 412.

At step 512, the method 500 includes applying, by the data processing hardware, a force to the ground surface by the distal end of the first leg based on the adjusted second coefficient of friction. Here, the robot friction estimator 210 updates the value of the terrain friction $\mu_{terrain}$ based on the estimated value of the foot friction $\mu_{foot}$ received from the leg friction estimator 220 and then provides the updated value of the terrain friction $\mu_{terrain}$ to the control system 170. The control system 170 then uses the updated values of the terrain friction $\mu_{terrain}$ and the foot frictions $\mu_{foot}$ for each of the respective feet 126a-126d to adjust the forces applied by the feet 126 of the robot 100 in subsequent gait cycles.

Figure 6:
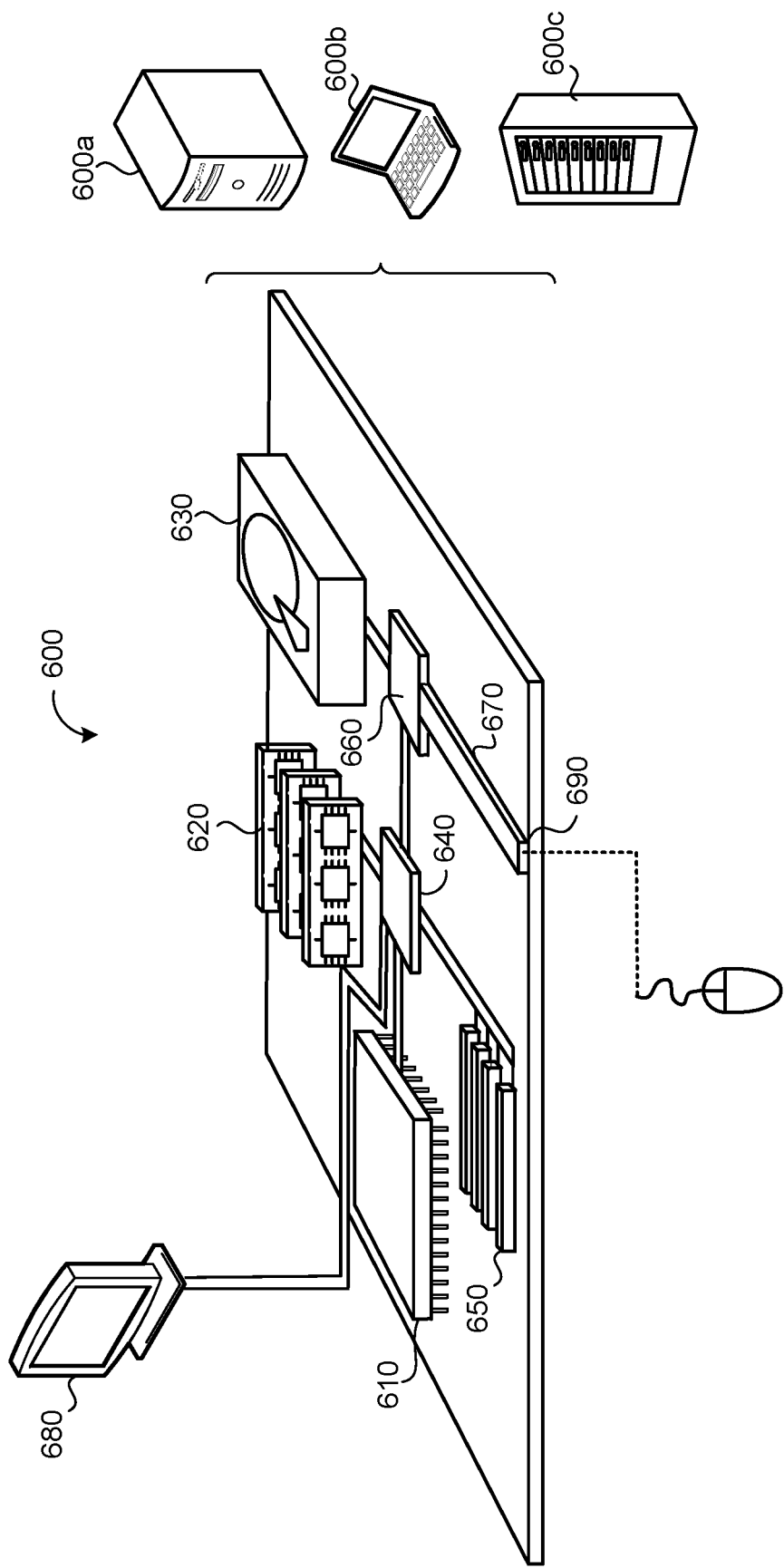
FIG. 6 is a schematic view of an example computing device that may be used to implement the systems and methods described herein.

FIG. 6 is schematic a view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610 (e.g., data processing hardware 602), memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 (e.g. memory hardware 604) stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 (e.g., memory hardware 604) is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
receiving, at data processing hardware of a robot including a plurality of legs, a first coefficient of friction corresponding to an estimated coefficient of friction for a ground surface supporting the robot;
determining, by the data processing hardware, when a distal end of a first leg of the plurality of legs is in contact with the ground surface;
when the distal end of the first leg of the plurality legs is in contact with the ground surface:
selecting, by the data processing hardware, from three or more stance states, a current stance state for the distal end of the first leg;
setting, by the data processing hardware, a second coefficient of friction associated with the distal end of the first leg based on the first coefficient of friction and the current stance state;
determining, by the data processing hardware, a measured velocity of the distal end relative to the ground surface;
adjusting, by the data processing hardware, the second coefficient of friction of the distal end based on the measured velocity of the distal end; and
applying, by the data processing hardware, a force to the ground surface by the distal end of the first leg based on the adjusted second coefficient of friction.

2. The method of claim 1, further comprising determining, by the data processing hardware, whether the measured velocity of the distal end of the first leg exceeds a threshold velocity.

3. The method of claim 2, wherein, when the measured velocity of the distal end of the first leg exceeds the threshold velocity, adjusting the second coefficient of friction comprises decreasing the second coefficient of friction.

4. The method of claim 2, further comprising, when the measured velocity of the distal end of the first leg exceeds the threshold velocity:
calculating, by the data processing hardware, a negative friction adjustment rate based on the measured velocity of the distal end of the first leg, wherein adjusting the second coefficient of friction comprises adjusting the second coefficient of friction based on the negative friction adjustment rate.

5. The method of claim 2, wherein, when the measured velocity of the distal end of the first leg does not exceed the threshold velocity, adjusting the second coefficient of friction comprises increasing the second coefficient of friction.

6. The method of claim 2, further comprising, when the measured velocity of the distal end of the first leg does not exceed the threshold velocity:
calculating, by the data processing hardware, a positive friction adjustment rate based on the measured velocity of the distal end of the first leg, wherein adjusting the second coefficient of friction comprises adjusting the second coefficient of friction based on the positive friction adjustment rate.

7. The method of claim 1, wherein the three or more stance states comprise a nominal stance state, a difficult stance state, and a slipping stance state.

8. The method of claim 7, wherein:
when the current stance state comprises the nominal stance state, adjusting the second coefficient of friction comprises maintaining or increasing the second coefficient of friction; and
when the current stance state comprises the slipping stance state, adjusting the second coefficient of friction comprises increasing or decreasing the second coefficient of friction.

9. The method of claim 7, wherein selecting the current stance state comprises initially setting the current stance state to the nominal stance state.

10. The method of claim 9, wherein selecting the current stance state further comprises transitioning the current stance state from the nominal stance state to the difficult stance state based on determining, by the data processing hardware, a vertical position error in a first direction relative to the ground surface and a shear positional error in a second direction relative to the ground surface.

11. The method of claim 10, wherein selecting the current stance state further comprises transitioning the current stance state from the difficult stance state to the slipping stance state based on comparing, by the data processing hardware, the measured velocity of the distal end to a threshold velocity.

12. The method of claim 7, wherein adjusting the second coefficient of friction comprises limiting, by the data processing hardware, a decrease of the second coefficient of friction when the current stance state is the nominal stance state.

13. The method of claim 9, further comprising limiting, by the data processing hardware, the decrease of the second coefficient of friction by a limiting constant.

14. The method of claim 1, wherein adjusting the second coefficient of friction comprises choosing, by the data processing hardware, an amount of adjustment based on the measured velocity of the distal end and the current stance state.

15. A system comprising:
data processing hardware; and
memory hardware in communication with the data processing hardware, the memory hardware storing instructions that when executed on the data processing hardware cause the data processing hardware to perform operations comprising:
receiving a first coefficient of friction corresponding to an estimated coefficient of friction for a ground surface;
determining when a distal end of a first leg of the plurality of legs is in contact with the ground surface;
when the distal end of the first leg of the plurality legs is in contact with the ground surface;
selecting from three or more stance states, a current stance state for the distal end of the first leg;
setting a second coefficient of friction associated with the distal end of the first leg based on the first coefficient of friction and the current stance state;
determining a measured velocity of the distal end of the first leg relative to the ground surface;
adjusting the second coefficient of friction of the distal end of the first leg based on the measured velocity of the foot; and
applying a force to the ground surface by the distal end of the first leg based on the adjusted second coefficient of friction.

16. The system of claim 15, wherein the operations further comprise determining whether the measured velocity of the distal end of the first leg exceeds a threshold velocity.

17. The system of claim 16, wherein, when the measured velocity of the distal end of the first leg exceeds the threshold velocity, adjusting the second coefficient of friction comprises decreasing the second coefficient of friction.

18. The system of claim 16, wherein the operations further comprise, when the measured velocity of the distal end of the first leg exceeds the threshold velocity:
calculating a negative friction adjustment rate based on the measured velocity of the distal end of the first leg, wherein adjusting the second coefficient of friction comprises adjusting the second coefficient of friction based on the negative friction adjustment rate.

19. The system of claim 16, wherein, when the measured velocity of the distal end of the first leg does not exceed the threshold velocity, adjusting the second coefficient of friction comprises increasing the second coefficient of friction.

20. The system of claim 16, wherein the operations further comprise, when the measured velocity of the distal end of the first leg does not exceed the threshold velocity:
calculating a positive friction adjustment rate based on the measured velocity of the distal end of the first leg, wherein adjusting the second coefficient of friction comprises adjusting the second coefficient of friction based on the positive friction adjustment rate.

21. The system of claim 15, wherein the three or more stance states comprise a nominal stance state, a difficult stance state.

22. The system of claim 21, wherein selecting the current stance state comprises:
initially setting the current stance state to the nominal stance state;
transitioning the current stance state from the nominal stance state to the difficult stance state based on determining a vertical position error in a first direction relative to the ground surface and a shear positional error in a second direction relative to the ground surface; and
transitioning the current stance state from the difficult stance state to the slipping stance state based on comparing, by the data processing hardware, the measured velocity of the distal end to a threshold velocity.

23. The system of claim 21, wherein adjusting the second coefficient of friction comprises limiting a decrease of the second coefficient of friction when the current stance state is the nominal stance state.

24. The system of claim 21, wherein:
when the current stance state comprises the nominal stance state, adjusting the second coefficient of friction comprises maintaining or increasing the second coefficient of friction; and
when the current stance state comprises the slipping stance state, adjusting the second coefficient of friction comprises increasing or decreasing the second coefficient of friction.

25. The system of claim 15, wherein adjusting the second coefficient of friction comprises choosing an amount of adjustment based on the measured velocity of the distal end and the current stance state.

26. A robot comprising:
a body and a plurality of legs attached to the body, each of the legs having a distal end;
data processing hardware; and
memory hardware in communication with the data processing hardware, the memory hardware storing instructions that when executed on the data processing hardware cause the data processing hardware to perform operations comprising:
receiving a first coefficient of friction corresponding to an estimated coefficient of friction for a ground surface supporting the robot;
determining when a distal end of a first leg of the plurality of legs is in contact with the ground surface;
when the distal end of the first leg of the plurality legs is in contact with the ground surface:
selecting from three or more stance states, a current stance state for the distal end of the first leg;
setting a second coefficient of friction associated with the distal end of the first leg based on the first coefficient of friction and the current stance state;
determining a measured velocity of the distal end of the first leg relative to the ground surface;
adjusting the second coefficient of friction of the distal end of the first leg based on the measured velocity of the distal end of the first leg; and
applying a force to the ground surface by the distal end of the second leg based on the adjusted second coefficient of friction.

27. The robot of claim 26, wherein the operations further comprise determining whether the measured velocity of the distal end of the first leg exceeds a threshold velocity.

28. The robot of claim 27, wherein, when the measured velocity of the distal end of the first leg exceeds the threshold velocity, adjusting the second coefficient of friction comprises decreasing the second coefficient of friction.

29. The robot of claim 27, wherein the operations further comprise, when the measured velocity of the distal end of the first leg exceeds the threshold velocity:
calculating a negative friction adjustment rate based on the measured velocity of the distal end of the first leg, wherein adjusting the second coefficient of friction comprises adjusting the second coefficient of friction based on the negative friction adjustment rate.

30. The robot of claim 27, wherein, when the measured velocity of the distal end of the first leg does not exceed the threshold velocity, adjusting the second coefficient of friction comprises increasing the second coefficient of friction.

31. The robot of claim 27, wherein the operations further comprise, when the measured velocity of the distal end of the first leg does not exceed the threshold velocity:
calculating a positive friction adjustment rate based on the measured velocity of the distal end of the first leg, wherein adjusting the second coefficient of friction comprises adjusting the second coefficient of friction based on the positive friction adjustment rate.

32. The robot of claim 26, wherein the three or more stance states comprise a nominal stance state, a difficult stance state, and a slipping stance state.

33. The robot of claim 32, wherein:
when the current stance state comprises the nominal stance state, adjusting the second coefficient of friction comprises maintaining or increasing the second coefficient of friction; and
when the current stance state comprises the slipping stance state, adjusting the second coefficient of friction comprises increasing or decreasing the second coefficient of friction.

34. The robot of claim 26, wherein adjusting the second coefficient of friction comprises choosing an amount of adjustment based on the measured velocity of the distal end and the current stance state.

35. The robot of claim 32, wherein selecting the current stance state comprises:
initially setting the current stance state to the nominal stance state;
transitioning the current stance state from the nominal stance state to the difficult stance state based on determining a vertical position error in a first direction relative to the ground surface and a shear positional error in a second direction relative to the ground surface; and
transitioning the current stance state from the difficult stance state to the slipping stance state based on comparing, by the data processing hardware, the measured velocity of the distal end to a threshold velocity.

36. The robot of claim 32, wherein adjusting the second coefficient of friction comprises limiting a decrease of the second coefficient of friction when the current stance state is the nominal stance state.

* * * * *

UNITED STATES PATENT AND TRADEMARK OFFICE
CERTIFICATE OF CORRECTION

PATENT NO. : 11,597,081 B2
APPLICATION NO. : 16/893739
DATED : March 7, 2023
INVENTOR(S) : Alexander Samuel Graber-Tilton It is certified that error appears in the above-identified patent and that said Letters Patent is hereby corrected as shown below:

In the Specification

In Column 3, Line 10, delete "$\mu_{terrain}$," and insert --terrain,--.

In Column 3, Line 61, delete "120sw." and insert --$120_{sw}$.--.

In Column 3, Line 61, delete "120sw" and insert --$120_{sw}$--.

In Column 3, Line 62, delete "120sw," and insert --$120_{sw}$,--.

In Column 4, Line 3, delete "120sw)" and insert --$120_{sw}$)--.

In Column 5, Line 48, delete "1," and insert --1B,--.

In Column 8, Line 27, delete "foot" and insert --$\mu_{foot}$--.

In Column 8, Line 32, delete "terrain." and insert --$\mu_{terrain}$.--.

In Column 9, Line 37 (Approx.), delete "3101" and insert --$310_i$--.

In Column 10, Line 17, delete "$\mu_{test}$" and insert --$\mu_{est}$--.

In Column 10, Line 20, delete "prior" and insert --$\mu_{prior}$--.

In Column 10, Line 50, delete "a" and insert --in a--.

In Column 12, Line 49, delete "d" and insert --d$\mu$--.

In Column 12, Line 50, delete "d" and insert --d$\mu$--.

Signed and Sealed this
Fourth Day of July, 2023

Katherine Kelly Vidal
*Director of the United States Patent and Trademark Office*

CERTIFICATE OF CORRECTION (continued)
U.S. Pat. No. 11,597,081 B2

In Column 12, Line 51, delete "d" and insert --dμ--.

In Column 12, Line 54, delete "d" and insert --dμ--.

In Column 12, Line 60, delete "d" and insert --dμ--.

In Column 12, Line 61, delete "d max." and insert --$d\mu_{max}$.--.

In Column 13, Line 1, delete "d" and insert --dμ--.

In Column 13, Line 3, delete "d" and insert --dμ--.

In Column 13, Line 23, delete "d" and insert --dμ--.

In Column 13, Line 39, delete "d" and insert --dμ--.

In Column 13, Line 44, delete "d" and insert --dμ--.

In Column 15, Line 25, delete "d" and insert --dμ--.

In the Claims

In Column 19, Claim 15, Line 54, delete "surface;" and insert --surface:--.

In Column 20, Claim 21, Line 30, delete "state." and insert --state, and a slipping stance state.--.